(12) United States Patent
George et al.

(10) Patent No.: US 7,627,250 B2
(45) Date of Patent: Dec. 1, 2009

(54) RADIO-OVER-FIBER TRANSPONDER WITH A DUAL-BAND PATCH ANTENNA SYSTEM

(75) Inventors: Jacob George, Horseheads, NY (US); Michael Sauer, Corning, NY (US); Luis A. Zenteno, Painted Post, NY (US)

(73) Assignee: Corning Cable Systems LLC, Hickory, NC (US)

( * ) Notice: Subject to any disclaimer, the term of this patent is extended or adjusted under 35 U.S.C. 154(b) by 504 days.

(21) Appl. No.: 11/504,999

(22) Filed: Aug. 16, 2006

(65) Prior Publication Data

US 2008/0044186 A1   Feb. 21, 2008

(51) Int. Cl.
*H04B 10/00* (2006.01)
(52) U.S. Cl. ............... 398/115; 398/116; 398/128
(58) Field of Classification Search ......... 398/115–117, 398/128
See application file for complete search history.

(56) References Cited

U.S. PATENT DOCUMENTS

| | | | |
|---|---|---|---|
| 4,365,865 A | 12/1982 | Stiles | |
| 4,867,527 A | 9/1989 | Dotti et al. | |
| 4,889,977 A | 12/1989 | Haydon | |
| 4,896,939 A | 1/1990 | O'Brien | 350/96.23 |
| 4,916,460 A | 4/1990 | Powell | 343/853 |
| 5,039,195 A | 8/1991 | Jenkins et al. | |
| 5,042,086 A | 8/1991 | Cole et al. | |
| 5,189,718 A | 2/1993 | Barrett et al. | |
| 5,189,719 A | 2/1993 | Coleman et al. | |
| 5,260,957 A | 11/1993 | Hakimi et al. | |
| 5,268,971 A | 12/1993 | Nilsson et al. | |
| 5,301,056 A | 4/1994 | O'Neill | 359/145 |
| 5,339,058 A | 8/1994 | Lique | |

(Continued)

FOREIGN PATENT DOCUMENTS

CA    2242707 A1    1/1999

(Continued)

OTHER PUBLICATIONS

A. J. Cooper, "Fiber/radio for the provision of cordless/mobile telephony services in the access network", Electronics Letters, vol. 26, pp. 2054-2056, 1990.

(Continued)

*Primary Examiner*—Dalzid Singh
(74) *Attorney, Agent, or Firm*—C. Keith Montgomery (57) ABSTRACT

The radio-over-fiber (RoF) transponder includes a converter unit adapted to convert RF electrical signals into optical signals and vice versa, and an antenna system electrically coupled to the converter unit. The antenna system includes first and second Z-shaped patch antenna elements formed on an antenna substrate. These patches are adapted to respectively transmit and receive radio-frequency (RF) electromagnetic radiation at a first frequency $f_A$ (e.g., 2.4 GHz) over a first picocell. The antenna system also includes a square patch antenna element formed atop the antenna substrate surface between the first and second Z-shaped patch antenna elements. The square patch antenna is adapted to transmit and receive RF electromagnetic radiation at a second frequency $f_B$ (e.g., 5.2 GHz) over a second picocell substantially co-located with the first picocell. One or more spaced-apart transponders can be supported by one or more optical fibers to form an array of picocells.

24 Claims, 9 Drawing Sheets

U.S. PATENT DOCUMENTS

| | | | |
|---|---|---|---|
| 5,339,184 A | 8/1994 | Tang | 359/124 |
| 5,377,035 A | 12/1994 | Wang et al. | |
| 5,400,391 A | 3/1995 | Emura et al. | 379/59 |
| 5,424,864 A | 6/1995 | Emura | 359/173 |
| 5,444,564 A | 8/1995 | Newberg | 359/187 |
| 5,457,557 A | 10/1995 | Zarem et al. | 359/121 |
| 5,469,523 A | 11/1995 | Blew et al. | |
| 5,543,000 A | 8/1996 | Lique | |
| 5,557,698 A | 9/1996 | Gareis et al. | |
| 5,598,288 A | 1/1997 | Collar | |
| 5,627,879 A | 5/1997 | Russell et al. | 379/59 |
| 5,640,678 A | 6/1997 | Ishikawa et al. | 455/33.2 |
| 5,644,622 A | 7/1997 | Russell et al. | 455/422 |
| 5,648,961 A | 7/1997 | Ebihara | 370/282 |
| 5,651,081 A | 7/1997 | Blew et al. | |
| 5,668,562 A | 9/1997 | Cutrer et al. | |
| 5,677,974 A | 10/1997 | Elms et al. | |
| 5,682,256 A | 10/1997 | Motley et al. | 359/117 |
| 5,703,602 A | 12/1997 | Casebolt | |
| 5,818,619 A | 10/1998 | Medved et al. | |
| 5,821,510 A | 10/1998 | Cohen et al. | |
| 5,825,651 A | 10/1998 | Gupta et al. | |
| 5,854,986 A | 12/1998 | Dorren et al. | |
| 5,867,485 A | 2/1999 | Chambers et al. | 370/281 |
| 5,881,200 A | 3/1999 | Burt | |
| 5,883,882 A | 3/1999 | Schwartz | |
| 5,910,776 A | 6/1999 | Black | |
| 5,913,003 A | 6/1999 | Arroyo et al. | |
| 5,930,682 A | 7/1999 | Schwartz et al. | |
| 5,936,754 A | 8/1999 | Ariyavisitakul et al. | 359/145 |
| 5,943,372 A | 8/1999 | Gans et al. | |
| 5,946,622 A | 8/1999 | Bojeryd | 455/444 |
| 5,949,564 A | 9/1999 | Wake | |
| 5,959,531 A | 9/1999 | Gallagher, III et al. | |
| 5,960,344 A | 9/1999 | Mahany | |
| 5,969,837 A | 10/1999 | Farber et al. | 359/132 |
| 5,983,070 A | 11/1999 | Georges et al. | |
| 6,005,884 A | 12/1999 | Cook et al. | 375/202 |
| 6,014,546 A | 1/2000 | Georges et al. | |
| 6,016,426 A | 1/2000 | Bodell | 455/422 |
| 6,127,917 A | 10/2000 | Tuttle | 340/10.1 |
| 6,128,470 A | 10/2000 | Naidu et al. | 455/16 |
| 6,150,921 A | 11/2000 | Werb et al. | 340/10.1 |
| 6,157,810 A | 12/2000 | Georges et al. | |
| 6,232,870 B1 | 5/2001 | Garber et al. | |
| 6,236,789 B1 | 5/2001 | Fitz | |
| 6,268,946 B1 | 7/2001 | Larkin et al. | 359/173 |
| 6,292,673 B1 | 9/2001 | Maeda et al. | 455/522 |
| 6,314,163 B1 | 11/2001 | Acampora | |
| 6,323,980 B1 * | 11/2001 | Bloom | 398/129 |
| 6,324,391 B1 | 11/2001 | Bodell | 455/403 |
| 6,337,754 B1 | 1/2002 | Imajo | 359/174 |
| 6,353,406 B1 | 3/2002 | Lanzl et al. | 342/118 |
| 6,353,600 B1 | 3/2002 | Schwartz et al. | |
| 6,374,124 B1 | 4/2002 | Slabinski | 455/562 |
| 6,405,018 B1 | 6/2002 | Reudink et al. | 455/20 |
| 6,405,058 B2 | 6/2002 | Bobier | 455/562 |
| 6,405,308 B1 | 6/2002 | Gupta et al. | |
| 6,438,301 B1 | 8/2002 | Johnson et al. | |
| 6,438,371 B1 | 8/2002 | Fujise et al. | 455/422 |
| 6,477,154 B1 * | 11/2002 | Cheong et al. | 370/328 |
| 6,501,965 B1 | 12/2002 | Lucidarme | 455/562 |
| 6,504,636 B1 * | 1/2003 | Seto et al. | 398/91 |
| 6,512,478 B1 | 1/2003 | Chien | |
| 6,519,395 B1 | 2/2003 | Bevan | |
| 6,525,855 B1 | 2/2003 | Westbrook et al. | |
| 6,556,551 B1 | 4/2003 | Schwartz | |
| 6,577,794 B1 | 6/2003 | Currie et al. | |
| 6,577,801 B2 | 6/2003 | Broderick et al. | |
| 6,594,496 B2 | 7/2003 | Schwartz | |
| 6,606,430 B2 | 8/2003 | Bartur et al. | |
| 6,634,811 B1 | 10/2003 | Gertel et al. | |
| 6,640,103 B1 | 10/2003 | Inman et al. | |
| 6,643,437 B1 | 11/2003 | Park | |
| 6,652,158 B2 | 11/2003 | Bartur et al. | |
| 6,675,294 B1 | 1/2004 | Gupta et al. | |
| 6,687,437 B1 | 2/2004 | Starnes et al. | |
| 6,710,366 B1 | 3/2004 | Lee et al. | |
| 6,731,880 B2 * | 5/2004 | Westbrook et al. | 398/115 |
| 6,758,913 B1 | 7/2004 | Tunney et al. | 134/21 |
| 6,771,862 B2 | 8/2004 | Karnik et al. | |
| 6,771,933 B1 | 8/2004 | Eng et al. | |
| 6,784,802 B1 | 8/2004 | Stanescu | |
| 6,785,558 B1 | 8/2004 | Stratford et al. | |
| 6,788,666 B1 | 9/2004 | Linebarger et al. | 370/338 |
| 6,801,767 B1 | 10/2004 | Schwartz et al. | 455/426.2 |
| 6,807,374 B1 | 10/2004 | Imajo et al. | 398/115 |
| 6,826,337 B2 | 11/2004 | Linnell | |
| 6,847,856 B1 | 1/2005 | Bohannon | |
| 6,865,390 B2 | 3/2005 | Goss et al. | 455/445 |
| 6,873,823 B2 | 3/2005 | Hasarchi et al. | |
| 6,879,290 B1 | 4/2005 | Toutain et al. | 343/700 |
| 6,883,710 B2 | 4/2005 | Chung | 235/385 |
| 6,885,846 B1 | 4/2005 | Panasik et al. | 455/41.2 |
| 6,889,060 B2 | 5/2005 | Fernando et al. | |
| 6,909,399 B1 | 6/2005 | Zegelin et al. | 342/463 |
| 6,915,058 B2 | 7/2005 | Pons | |
| 6,920,330 B2 | 7/2005 | Caronni et al. | 455/456.1 |
| 6,924,997 B2 | 8/2005 | Chen et al. | |
| 6,930,987 B1 | 8/2005 | Fukuda et al. | 370/328 |
| 6,931,183 B2 | 8/2005 | Panak et al. | |
| 6,931,813 B2 | 8/2005 | Panak et al. | 385/101 |
| 6,933,849 B2 | 8/2005 | Sawyer | 340/572.4 |
| 6,965,718 B2 | 11/2005 | Koertel | 385/101 |
| 6,968,107 B2 | 11/2005 | Belardi et al. | |
| 6,973,243 B2 | 12/2005 | Koyasu et al. | |
| 6,974,262 B1 | 12/2005 | Rickenbach | |
| 7,013,087 B2 | 3/2006 | Suzuki et al. | 398/115 |
| 7,020,473 B2 | 3/2006 | Splett | 455/456.1 |
| 7,035,512 B2 | 4/2006 | Van Bijsterveld | |
| 7,039,399 B2 | 5/2006 | Fischer | 455/422.1 |
| 7,054,513 B2 | 5/2006 | Herz et al. | |
| 7,072,586 B2 | 7/2006 | Aburakawa et al. | 398/115 |
| 7,084,769 B2 | 8/2006 | Bauer et al. | 340/572.7 |
| 7,106,931 B2 | 9/2006 | Sutehall et al. | |
| 7,127,176 B2 | 10/2006 | Sasaki | |
| 7,142,503 B1 | 11/2006 | Grant et al. | |
| 7,200,305 B2 | 4/2007 | Dion et al. | |
| 7,269,311 B2 | 9/2007 | Kim et al. | |
| 7,295,119 B2 | 11/2007 | Rappaport et al. | |
| 7,310,430 B1 | 12/2007 | Mallya et al. | |
| 7,324,730 B2 | 1/2008 | Varkey et al. | |
| 7,349,633 B2 | 3/2008 | Lee et al. | |
| 7,359,408 B2 * | 4/2008 | Kim | 370/509 |
| 7,366,150 B2 | 4/2008 | Lee et al. | |
| 7,409,159 B2 | 8/2008 | Izadpanah | |
| 7,424,228 B1 | 9/2008 | Williams et al. | |
| 7,444,051 B2 | 10/2008 | Tatat et al. | |
| 7,450,853 B2 | 11/2008 | Kim et al. | |
| 7,460,831 B2 | 12/2008 | Hasarchi | |
| 7,469,105 B2 | 12/2008 | Wake et al. | |
| 7,496,384 B2 | 2/2009 | Seto et al. | |
| 2002/0003645 A1 | 1/2002 | Kim et al. | |
| 2002/0048071 A1 | 4/2002 | Suzuki et al. | |
| 2002/0075906 A1 | 6/2002 | Cole et al. | 370/535 |
| 2002/0092347 A1 | 7/2002 | Niekerk et al. | |
| 2002/0111192 A1 | 8/2002 | Thomas et al. | 455/562 |
| 2002/0114038 A1 * | 8/2002 | Arnon et al. | 359/145 |
| 2002/0126967 A1 | 9/2002 | Panak et al. | |
| 2002/0130778 A1 | 9/2002 | Nicholson | |
| 2002/0181668 A1 | 12/2002 | Masoian et al. | 379/56.3 |
| 2002/0190845 A1 | 12/2002 | Moore | 340/10.3 |
| 2003/0007214 A1 | 1/2003 | Aburakawa et al. | |
| 2003/0016418 A1 | 1/2003 | Westbrook et al. | |

| | | |
|---|---|---|
| 2003/0045284 A1 | 3/2003 | Copley et al. ............... 455/426 |
| 2003/0078074 A1 | 4/2003 | Sesay et al. |
| 2003/0141962 A1 | 7/2003 | Barink .................... 340/10.42 |
| 2003/0161637 A1 | 8/2003 | Yamamoto et al. |
| 2003/0165287 A1 | 9/2003 | Krill et al. .................... 385/24 |
| 2003/0174099 A1 | 9/2003 | Bauer et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst ......................... 370/328 |
| 2004/0041714 A1 | 3/2004 | Forster |
| 2004/0043764 A1 | 3/2004 | Bigham et al. |
| 2004/0047313 A1 | 3/2004 | Rumpf et al. ............... 370/335 |
| 2004/0078151 A1 | 4/2004 | Aljadeff et al. |
| 2004/0149736 A1 | 8/2004 | Clothier |
| 2004/0151503 A1 | 8/2004 | Kashima et al. |
| 2004/0157623 A1 | 8/2004 | Splett |
| 2004/0162115 A1 | 8/2004 | Smith et al. |
| 2004/0162116 A1 | 8/2004 | Han et al. .................. 455/563 |
| 2004/0175173 A1 | 9/2004 | Deas |
| 2004/0202257 A1 | 10/2004 | Mehta et al. |
| 2004/0203704 A1 | 10/2004 | Ommodt et al. .......... 455/422.1 |
| 2004/0203846 A1 | 10/2004 | Caronni et al. |
| 2004/0204109 A1 | 10/2004 | Hoppenstein ............ 455/562.1 |
| 2004/0208526 A1 | 10/2004 | Mibu |
| 2004/0218873 A1 | 11/2004 | Nagashima et al. |
| 2004/0233877 A1 | 11/2004 | Lee et al. .................... 370/338 |
| 2004/0258105 A1 | 12/2004 | Spathas et al. .............. 370/539 |
| 2005/0052287 A1 | 3/2005 | Whitesmith et al. |
| 2005/0058451 A1 | 3/2005 | Ross ........................... 398/70 |
| 2005/0068179 A1 | 3/2005 | Roesner |
| 2005/0076982 A1 | 4/2005 | Metcalf et al. |
| 2005/0078006 A1 | 4/2005 | Hutchins et al. |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0141545 A1 | 6/2005 | Fein et al. |
| 2005/0143077 A1 | 6/2005 | Charbonneau |
| 2005/0148306 A1 | 7/2005 | Hiddink |
| 2005/0159108 A1 | 7/2005 | Fletcher et al. |
| 2005/0174236 A1 | 8/2005 | Brookner |
| 2005/0201761 A1 | 9/2005 | Bartur et al. |
| 2005/0219050 A1 | 10/2005 | Martin |
| 2005/0224585 A1 | 10/2005 | Durrant et al. |
| 2005/0226625 A1 | 10/2005 | Wake et al. .................. 398/115 |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0259930 A1 | 11/2005 | Elkins et al. |
| 2005/0266797 A1 | 12/2005 | Utsumi et al. .................... 455/7 |
| 2005/0266854 A1 | 12/2005 | Niiho et al. .................. 455/445 |
| 2005/0271396 A1 | 12/2005 | Iannelli ....................... 398/193 |
| 2006/0002326 A1 | 1/2006 | Vesuna |
| 2006/0017633 A1 | 1/2006 | Pronkine .................... 343/729 |
| 2006/0045054 A1 | 3/2006 | Utsumi et al. |
| 2006/0062579 A1 | 3/2006 | Kim et al. |
| 2006/0094470 A1 | 5/2006 | Wake et al. ............... 455/562.1 |
| 2006/0104643 A1 | 5/2006 | Lee et al. |
| 2006/0182446 A1 | 8/2006 | Kim et al. |
| 2006/0182449 A1 | 8/2006 | Iannelli et al. .............. 398/186 |
| 2006/0189354 A1 | 8/2006 | Lee et al. .................... 455/561 |
| 2006/0233506 A1 | 10/2006 | Noonan et al. |
| 2006/0239630 A1 | 10/2006 | Hase et al. |
| 2007/0009266 A1 | 1/2007 | Bothwell et al. ............. 398/161 |
| 2007/0058978 A1 | 3/2007 | Lee et al. |
| 2007/0149250 A1 | 6/2007 | Crozzoli et al. |
| 2007/0166042 A1 | 7/2007 | Seeds et al. .................. 398/142 |
| 2007/0253714 A1 | 11/2007 | Seeds et al. .................. 398/115 |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0031628 A1 | 2/2008 | Dragas et al. |
| 2008/0056167 A1 | 3/2008 | Kim et al. |
| 2008/0058018 A1 | 3/2008 | Scheinert |
| 2008/0124086 A1 | 5/2008 | Matthews |
| 2008/0124087 A1 | 5/2008 | Hartmann et al. |
| 2008/0145061 A1 | 6/2008 | Lee et al. |
| 2008/0150514 A1 | 6/2008 | Codreanu et al. |
| 2008/0194226 A1 | 8/2008 | Rivas et al. |
| 2008/0212969 A1 | 9/2008 | Fasshauer et al. |
| 2008/0219670 A1 | 9/2008 | Kim et al. |
| 2008/0232799 A1 | 9/2008 | Kim |
| 2008/0247716 A1 | 10/2008 | Thomas et al. |
| 2008/0253773 A1 | 10/2008 | Zheng |
| 2008/0260388 A1 | 10/2008 | Kim et al. |
| 2008/0273844 A1 | 11/2008 | Kewitsch |
| 2008/0298813 A1 | 12/2008 | Song et al. |
| 2008/0304831 A1 | 12/2008 | Miller, II et al. |
| 2008/0310848 A1 | 12/2008 | Yasuda et al. |
| 2009/0041413 A1 | 2/2009 | Hurley |
| 2009/0047023 A1 | 2/2009 | Pescod et al. |

FOREIGN PATENT DOCUMENTS

| | | |
|---|---|---|
| DE | 20104862 U1 | 8/2001 |
| DE | 10249414 A1 | 5/2004 |
| EP | 0477952 A2 | 9/1991 |
| EP | 0477952 A3 | 9/1991 |
| EP | 0461583 B1 | 3/1997 |
| EP | 0687400 | 11/1998 |
| EP | 0993124 A2 | 4/2000 |
| EP | 9003124 A3 | 4/2000 |
| EP | 1202475 A2 | 5/2002 |
| EP | 1363352 A1 | 11/2003 |
| EP | 1391897 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1511203 B1 | 3/2006 |
| EP | 1693974 A1 | 8/2006 |
| EP | 1742388 A1 | 1/2007 |
| GB | 2323252 A | 9/1998 |
| GB | 2399963 A | 9/2004 |
| GB | 2428149 A | 1/2007 |
| JP | 5260018 A | 8/1993 |
| JP | 083450 A | 3/1997 |
| JP | 9162810 A | 6/1997 |
| JP | 09-200840 | 7/1997 |
| JP | 1168675 A | 3/1999 |
| JP | 2000-152300 | 5/2000 |
| JP | 2000-341744 | 8/2000 |
| JP | 2002-264617 | 9/2002 |
| JP | 2003-148653 | 5/2003 |
| JP | 2003-172827 | 6/2003 |
| JP | 2004-172734 | 6/2004 |
| JP | 2004-245963 | 9/2004 |
| JP | 2004-247090 | 9/2004 |
| JP | 2004-264901 | 9/2004 |
| JP | 2004-265624 | 9/2004 |
| JP | 2004-317737 | 11/2004 |
| JP | 2004-349184 | 12/2004 |
| JP | 2005-018175 | 1/2005 |
| JP | 2005-087135 | 4/2005 |
| JP | 2005-134125 | 5/2005 |
| JP | 2007-228603 | 9/2007 |
| JP | 2008-172597 | 7/2008 |
| WO | WO 01/78434 A1 | 10/2001 |
| WO | WO0230141 A1 | 4/2002 |
| WO | WO02/102102 A1 | 12/2002 |
| WO | WO03/098175 A1 | 11/2003 |
| WO | WO2004/030154 A2 | 4/2004 |
| WO | WO2004/047472 A1 | 6/2004 |
| WO | WO2004/056019 A2 | 7/2004 |
| WO | WO2004056019 A1 | 7/2004 |

| | | |
|---|---|---|
| WO | WO2004/093471 A2 | 10/2004 |
| WO | WO2004/093471 A3 | 10/2004 |
| WO | WO2004086795 A2 | 10/2004 |
| WO | WO2005/062505 A1 | 7/2005 |
| WO | WO2005/069203 A2 | 7/2005 |
| WO | WO2005/073897 A1 | 8/2005 |
| WO | WO2005/079386 A2 | 9/2005 |
| WO | WO2005/101701 A2 | 10/2005 |
| WO | WO2005/111959 A2 | 11/2005 |
| WO | WO2006/011778 A1 | 2/2006 |
| WO | WO2006/018592 A1 | 2/2006 |
| WO | WO2006/018592 A1 | 2/2006 |
| WO | WO2006/019392 A1 | 2/2006 |
| WO | WO2006/136811 A1 | 12/2006 |
| WO | WO2007/077451 A1 | 7/2007 |
| WO | WO2007/091026 A1 | 8/2007 |
| WO | WO2008/033298 A2 | 3/2008 |

OTHER PUBLICATIONS

D. Huang, C. Chiu, "A WLAN-used helical antenna fully integratd with the PCMCIA carrier" IEEE Trans. Ant And Prop., vol. 53, No. 12, pp. 4164-4168, Dec. 2005.

Niiho, T. et al., "Multi-Channel Wireless LAN Distributed Antenna System Based on Radio-Over-Fiber Techniques," Lasers and Electro-Optics Society 2004, LEOS 2004, The 17th Annual Meeting of the IEEE, vol. 1, Nov. 7-11, 2004, pp. 57-58.

Bakaul, M. et al., "Efficient Multiplexing Scheme for Wavelength-Interleaved DWDM Millimeter-Wave Fiber-Radio Systems," IEEE Photonics Technology Letters, vol. 17, No. 12, Dec. 2005.

Moreira, J.D. et al., "Diversity Techniques for OFDM Based WLAN Systems," pp. 1008-1011, PIMRC 2002 IEEE.

Gibson et al., "Evanescent Field Analysis of Air-Silica Microstructure Waveguides," IEEE, 1-7803-7104-4/01, 2001, pp. 709-710.

ITU-T 0.652, Telecommunication Standardization Sector of ITU, Jun. 2005, Series G: Transmission Systems and Media, Digital Systems and Networks, Transmission Media and Optical Systems Characteristics—Optical Fiber Cables, Characteristics of a Single-Mode Optical Fiber and Cable, ITU-T Recommendation G.652, 22 pages.

ITU-T G.657, Telecommunication Standardization Sector of ITU, Dec. 2006, Series G: Transmission Systems and Media, Digital Systems and Networks, Transmission Media and Optical Systems Characteristics—Optical Fiber Cables, Characteristics of a Bending Loss Insensitive Single Mode Optical Fiber and Cable for the Access Network, ITU-T Recommendation G.657, 20 pages.

Kojucharow, K. et al., "Millimeter-Wave Signal Properties Resulting from Electrooptical Upconversion," IEEE Transaction on Microwave Theory and Techniques, vol. 49, No. 10, Oct. 2001, pp. 1977-1985.

Monro et al., "Holey Fibers with Random Cladding Distributions," Optics Letters, vol. 25, No. 4, Feb. 15, 2000.

Winters, J., Salz, J., and Gitlin, R., "The Impact of Antenna Diversity on the Capacity of Wireless Communications Systems," IEEE Transcations on Communications, vol. 42, No. 2/3/4, Feb./Mar./Apr. 1994.

Wake, D. et al., "Passive Picocell: A New Concept in Wireless Network Infrastructure," Electronics Letters, vol. 33, No. 5, Feb. 27, 1997, pp. 404-406.

Paulraj, A. et al., "An Overview of MIMO Communications—A Key to Gigabit Wireless," Proceedings of the IEEE, vol. 92, No. 2, Feb. 2004.

Pickrell et al., "Novel Techniques for the Fabrication of Holey Optical Fibers," SPIE Conference Proceedings, vol. 4578, pp. 271-282, 2001.

RFID Technology Overview, 11 pages.

Roh, W. and Paulraj, A., "MIMO Channel Capacity for the Distributed Antenna Systems," Vehicular Technology Conference, 2002, proceedings, VTC 2002-Fall, 2002 IEEE 56th, vol. 2, Sep. 24-28, 2002, pp. 706-709.

Seto, I. et al., "Antenna-Selective Trasmit Diversity Technique for OFDM-Based WLANs with Dual-Band Printed Antennas," pp. 51-56, IEEE Communications Society/WCNC 2005.

Shen, C., Zhou, S., and Yao, Y., "Comparison of Channel Capacity for MIMO-DAS versus MIMO-CAS," Communications, 2003, APCC 2003, The 9th Asia-Pacific Conference, vol. 1, Sep. 21-24, 2003, pp. 113-118.

* cited by examiner

RADIO-OVER-FIBER TRANSPONDER WITH A DUAL-BAND PATCH ANTENNA SYSTEM

BACKGROUND OF THE INVENTION

1. Field of the Invention

The present invention relates in general to radio-over-fiber (RoF) systems, and in particular relates to transponders used in RoF systems.

2. Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (coffee shops, airports, hospitals, libraries, etc.). The typical wireless communication system has a head-end station connected to an access point device via a wire cable. The access point device includes digital information processing electronics and a RF transmitter/receiver operably connected to an antenna. The access point device communicates with wireless devices called "clients," which must reside within the wireless range or a "cell coverage area" in order to communicate with the access point device.

The size of a given cell is determined by the amount of RF power transmitted by the access point device, the receiver sensitivity, antenna gain, and the RF environment, as well as by the RF transmitter/receiver sensitivity of the wireless client device. Client devices usually have a fixed RF receive sensitivity, so that the above-mentioned properties of the access point device largely determine the cell size. Connecting a number of access point devices to the head-end controller creates an array of cells that provide cellular coverage over an extended region.

One approach to deploying a wireless communication system involves creating "picocells," which are wireless cells having a radius in the range from about a few meters up to about 20 meters. Because a picocell covers a small area, there are typically only a few users (clients) per picocell. A closely packed picocellular array provides high per-user data-throughput over the picocellular coverage area. Picocells also allow for selective wireless coverage of small regions that otherwise would have poor signal strength when covered by larger cells created by conventional base stations.

One type of wireless system for creating picocells utilizes radio-frequency (RF) signals sent over optical fibers—called "radio over fiber" or "RoF" for short. Such systems include a head-end station optically coupled to a transponder via an optical fiber link. Unlike a conventional access point device, the transponder has no digital information processing capability. Rather, the digital processing capability resides in the head-end station. The transponder is transparent to the RF signals and simply converts incoming optical signals from the optical fiber link to electrical signals, which are then converted to radiated electromagnetic signals via an antenna. The antenna also receives radiated electromagnetic signals from one or more client devices and converts the radiated electromagnetic signals to electrical signals. The transponder then converts the electrical signals to optical signals, which are then sent to the head-end station via the optical fiber link.

Multiple transponders are typically distributed throughout an optical fiber cable as a "transponder array," wherein the optical fiber cable carries optical fiber links optically coupled to the transponders. The picocells associated with the transponder array form a picocell coverage area. To reduce picocell cross-talk, high-directivity transponder antennas can be used.

One application of picocellular wireless systems involves providing a number of different services (e.g., wireless local area network (WLAN), voice, RFID tracking, temperature and/or light control) within a building, usually by deploying one or more optical fiber cables close to the ceiling. This requires the picocells to be directed downward from the optical fiber cable, which requires an efficient and compact directional transponder that operates at multiple frequencies.

SUMMARY OF THE INVENTION

One aspect of the invention is a RoF transponder that includes a converter unit adapted to convert RF electrical signals into optical signals and vice versa. An antenna system is electrically coupled to the converter unit. First and second Z-shaped patch antenna elements are formed on the antenna substrate surface and are adapted to respectively transmit and receive radio-frequency (RF) electromagnetic radiation at a first frequency $f_A$ over a first picocell. A square patch antenna element is also formed on the antenna substrate surface between the first and second Z-shaped patch antenna elements. The square patch antenna is adapted to transmit and receive RF electromagnetic radiation ("electromagnetic signals") at a second frequency $f_B$ over a second picocell that at least substantially overlaps the first picocell so that the first and second picocells are substantially co-located.

Another aspect of the invention is a RoF picocellular wireless system. The system includes a head-end station adapted to provide first and second downlink RF optical signals having respective first and second frequencies $f_A$ and $f_B$. The head-end station is also adapted to receive and process first and second uplink RF optical signals having respective first and second frequencies $f_A$ and $f_B$. The system also includes an optical fiber cable optically coupled to the head-end station. The optical fiber cable has one or more optical fiber communication links adapted to carry the first and second downlink RF optical signals and the first and second uplink optical signals. The system further includes one or more transponders respectively optically coupled to the corresponding one or more optical fiber communication links. The transponder has a converter unit adapted to convert RF optical signals to RF electrical signals and vice versa. The transponder includes a micro-strip antenna system that has first and second Z-shaped patch antenna elements. These antenna elements are adapted to respectively transmit and receive RF electromagnetic radiation at the first frequency $f_A$ over a first picocell. The antenna system also includes a square patch antenna element arranged in between the first and second Z-shaped patch antenna elements. The square patch antenna element is adapted to transmit and receive RF electromagnetic radiation at the second frequency $f_B$ over a second picocell substantially co-located with the first picocell. The picocells of adjacent transponders do not substantially overlap, i.e., they do not substantially interfere.

Another aspect of the invention is a method of generating first and second substantially overlapping (and thus substantially co-located) first and second picocells at respective first and second frequencies. The method includes providing first and second downlink optical signals of respective first and second frequencies $f_A$ and $f_B$ to RoF transponder. The method also includes converting the first and second downlink optical signals to corresponding first and second electrical signals at the transponder. The method also includes feeding the first electrical downlink signals to a Z-shaped patch antenna adapted to transmit at the first frequency $f_A$ so as to form a first picocell, and feeding the second electrical downlink signals to a square-shaped patch antenna adapted to transmit at the second frequency $f_B$ so as to form a second picocell substantially co-located with the first picocell.

Additional features and advantages of the invention are set forth in the detailed description that follows, and will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

Accordingly, various basic electronic circuit elements and signal-conditioning components, such as bias tees, RF filters, amplifiers, power dividers, etc., are not all shown in the Figures for ease of explanation and illustration. The application of such basic electronic circuit elements and components to the present invention will be apparent to one skilled in the art.

DETAILED DESCRIPTION OF THE PREFERRED EMBODIMENTS

Reference is now made in detail to the present preferred embodiments of the invention, examples of which are illustrated in the accompanying drawings. Whenever possible, the same or analogous reference numbers are used throughout the drawings to refer to the same or like parts.

Figure 1:
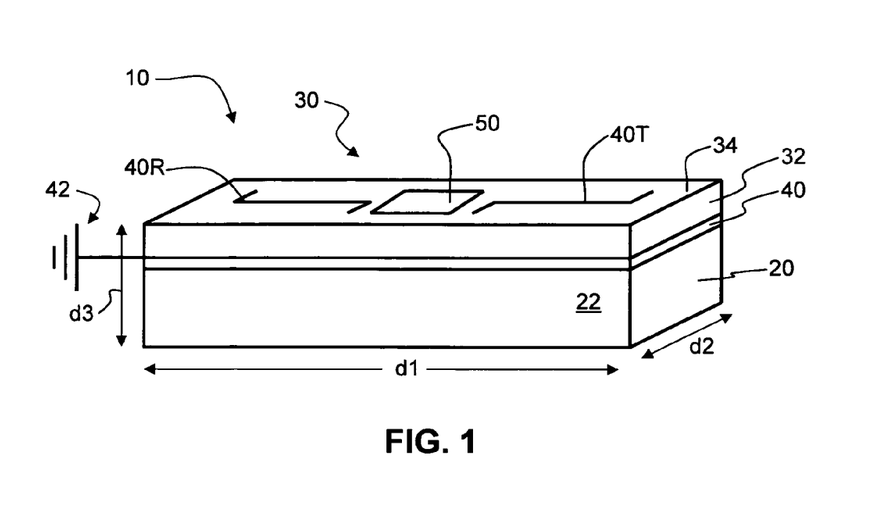
FIG. 1 is a perspective schematic diagram of an example embodiment of a RoF planar transponder according to the present invention.

FIG. 1 is a perspective schematic diagram of an example embodiment of a RoF planar transponder 10 according to the present invention. Transponder 10 includes a converter unit 20 that has a converter unit housing 22, and a microstrip patch antenna system ("antenna system") 30 electrically coupled to the converter unit. Transponder 10 also includes in between converter unit 20 and antenna system 30 a conductive ground layer 40 having or otherwise connectable to ground 42. In an example embodiment, conductive ground layer 40 is a metal layer formed on the side of antenna substrate 32 opposite surface 34 and acts as a reflecting ground plane to radiation incident the transponder. Example materials for conductive ground layer 40 are copper and gold. A typical thickness of conductive ground layer 40 is on the order of tens of microns.

Antenna System

Figure 2:
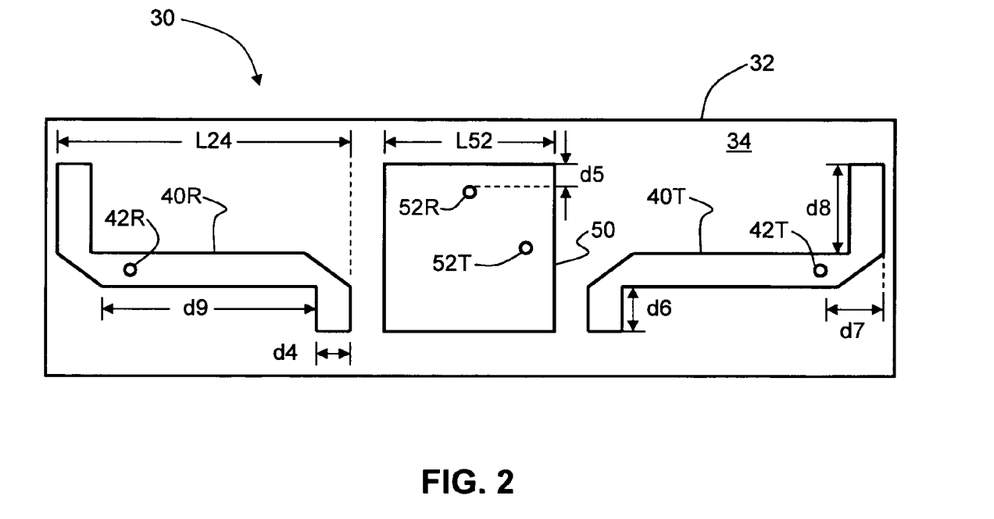
FIG. 2 is a plan view of an example embodiment of the microstrip patch antenna system of the transponder of FIG. 1.

FIG. 2 is a plan view of an example embodiment of antenna system 30 of FIG. 1. Antenna system 30 includes an insulating antenna substrate 32 with an upper surface 34. In an example embodiment, antenna substrate 32 is made of alumina having a (real) dielectric constant $\in_r=9.2$ and $\in_i/\in_r=\tan \delta=0.001$ (where $\in_i$ is the imaginary part of the dielectric constant) and a height (thickness) of ~1.6 mm. Antenna system 30 includes two Z-shaped integrated microstrip antenna elements ("patches") 40T and 40R formed on upper surface 34. Patches 40T and 40R are designed to act as transmit and receive antennas, respectively, at a first frequency $f_A$, which in an example embodiment is a frequency in the 2.4 GHz band. Patches 40T and 40R respectively include transmit and receive feed points (ports) 42T and 42R.

Antenna system 30 also includes a square antenna element (patch) 50 in between patches 40T and 40R. Patch 50 is designed to both transmit and receive at a second frequency $f_B$, which in an example embodiment is a frequency in the 5.2 GHz band. Patch 50 includes a transmit feed point (port) 52T, and a receive port 52R.

Antenna system 30 has a number of dimensions d1 through d9 and L24 and L52 as shown in FIGS. 1 and 2. In an example embodiment of antenna system 30, these dimensions are as follows: d1~50 mm, d2~9 mm, d3~150 mm, d4~1.6 mm, L52~8 mm, d5~1 mm, d6~2.2 mm d7~4.5 mm, d8~3.2 mm, d9~14.4 mm and L24~17.6 mm.

A preferred embodiment of the present invention is a compact transponder 10 that is easily incorporated into or otherwise supported by an optical fiber cable, as discussed below. Accordingly, in an example embodiment, antenna substrate surface 34 has an area substantially corresponding to the size of converter unit housing 22. In this regard, the use of a dual-port square patch antenna for the 2.4 GHz band is preferably avoided, since the antenna patch size increases with wavelength and results in a non-compact transponder.

The properties of antenna system 30 are largely determined by the dielectric constant and thickness of antenna substrate 32, the desired frequencies $f_A$ and $f_B$ (e.g., 2.4 GHz and 5.2 GHz), the size of converter unit 20, and the material used for converter unit housing 22. The design of antenna system 30 for specific frequencies $f_A$ and $f_B$ is facilitated by the availability of electromagnetic modeling software such as Ansoft HFSS, available from Ansoft Corporation, Pittsburg, Pa.

In an example embodiment, the following starting antenna parameters are used:

$$L_{24} \cong \frac{\lambda_{g24}}{2}$$

$$L_{52} \cong \frac{\lambda_{g52}}{2}$$

where, $\lambda_{gxy}$ stands for the wavelength inside the antenna substrate material at the frequency x.y GHz. For instance, at 2.4 GHz and an alumina antenna substrate 32 with a dielectric constant $\in_r=9.2$, $\lambda_{g24}=4.037$ cm. With such starting dimensions, various parameters for patch antennas 40T, 40R and 50, such as return loss, radiation pattern directionality, bandwidth, size, and isolation can be established, e.g., via computer simulation.

Converter Unit

Figure 3:
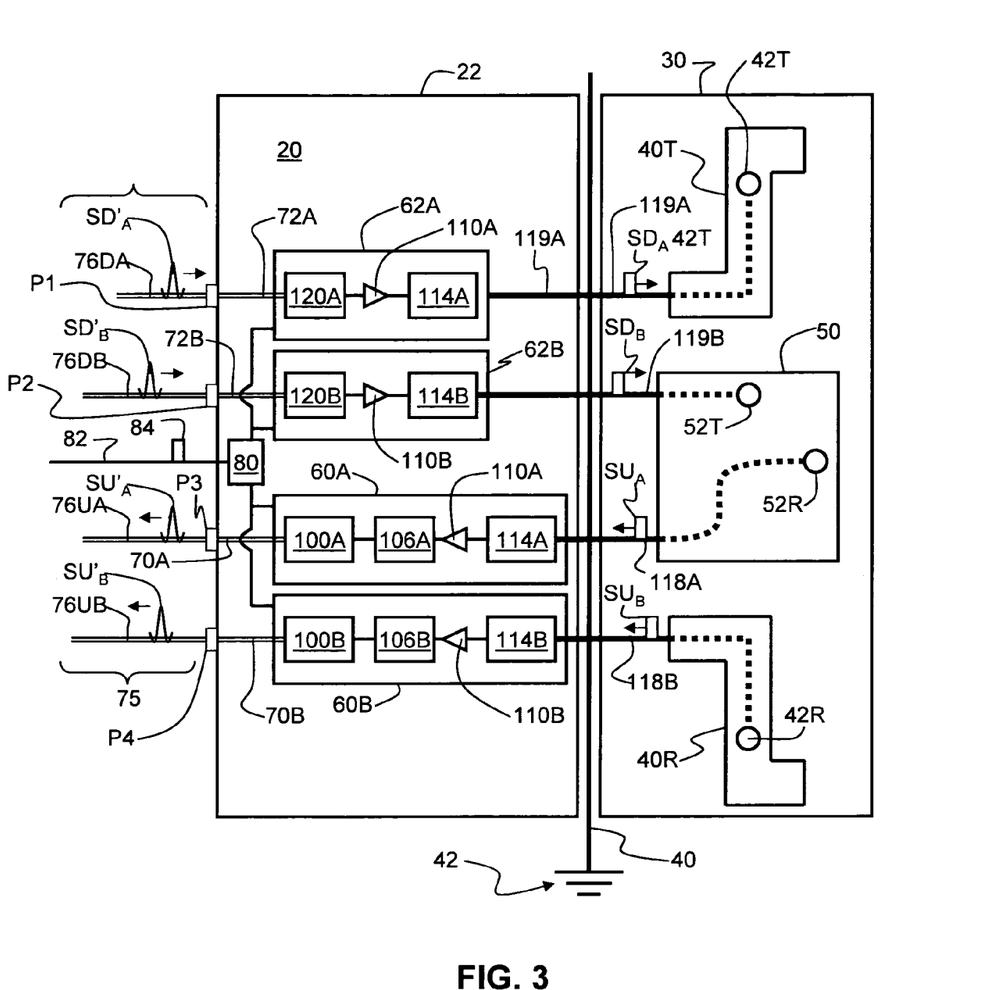
FIG. 3 is a detailed schematic diagram of an example embodiment of a converter unit for the transponder of FIG. 1, also schematically illustrating how the patch antenna system is electrically coupled to the converter unit.

FIG. 3 is a schematic diagram of an example embodiment of a four-port converter unit 20 for transponder 10 of FIG. 1. Converter unit 10 is shown optically coupled to an optical fiber communication link 75 that in an example embodiment includes four optical fibers coupled to four converter ports P1 through P4: downlink optical fibers 76DA and 76DB that respectively carry downlink optical signals SD'$_A$ of frequency $f_A$ and SD'$_B$ of frequency $f_B$, and uplink optical fibers 76UA and 76UB that respectively carry uplink optical signals SU'$_A$ of frequency $f_A$ and SU'$_B$ of frequency $f_B$. The sections of optical fiber connected to ports P1 through P4 and extending into converter housing 22 are labeled to correspond to the associated downlink and uplink optical fiber connected to the particular port for ease of illustration and discussion.

Converter unit 20 includes electrical-to-optical (E/O) converters 60A and 60B adapted to respectively convert uplink electrical signals SU$_A$ and SU$_B$ into corresponding uplink optical signals SU'$_A$ and SU'$_B$. Converter 10 also includes optical-to-electrical (O/E) converters 62A and 62B that convert downlink optical signals SD'$_A$ and SD'$_B$ into corresponding downlink electrical signals SD$_A$ and SD$_B$. E/O converters 60A and 60B are respectively optically coupled to respective input ends 70A and 70B of uplink optical fibers 76UA and 76UB. Likewise, O/E converters 62A and 62B are respectively optically coupled to respective output ends 72A and 72B of downlink optical fibers 76DA and 76DB.

In an example embodiment, converter unit 20 includes a DC power converter 80 electrically coupled to an electrical power line 82 and to E/O converters 60A and 60B, and O/E converters 62A and 62B. DC power converter 80 is adapted to change the voltage levels and provide the power required by the power-consuming components in converter unit 20. In an example embodiment, DC power converter 80 is either a DC/DC power converter, or an AC/DC power converter, depending on the type of power signal 84 carried by electrical power line 82. In an example embodiment, electrical power line 82 includes one or more power-carrying wires (not shown).

In the example embodiment of converter unit 20 of FIG. 3, E/O converter 60A is adapted to receive uplink electrical signals SU$_A$ from receiver patch antenna 40R and convert them to uplink optical signals SU'$_A$. In an example embodiment, E/O converter unit 60A includes a laser 100A optically coupled to input end 70A of uplink optical fiber 76UA, a bias-T unit 106A electrically coupled to the laser, an amplifier 110A electrically coupled to the bias-T unit and adapted to amplify electrical signals of frequency $f_A$, and a RF filter 114A electrically coupled to the amplifiers and adapted to filter electrical signals of frequency $f_A$. A RF cable section 118A is electrically connected to RF filter 114A. RF cable section 118A carries uplink electrical signals SD$_A$ and leads to receive port 42R on receiver patch 40R.

Likewise, E/O converter 60B is adapted to receive uplink electrical signals SU$_B$ from patch antenna 50 and convert them to uplink optical signals SU'$_B$. In an example embodiment, E/O converter 60B includes a laser 100B optically coupled to input end 70B of uplink optical fiber 76UB, a bias-T unit 106B electrically coupled to the laser, an amplifier 110B electrically coupled to the bias-T unit and adapted to amplify electrical signals frequency $f_B$, and a RF filter 114B electrically coupled to the amplifier and adapted to filter electrical signals of frequency $f_B$. A RF cable section 118B is electrically connected to RF filter 114B. RF cable section 118B carries electrical uplink signals SD$_B$ and leads to receive port 52R on receiver/transmitter patch antenna 50.

With continuing reference to FIG. 3, O/E converter 62A is adapted to receive downlink optical signals SD'$_A$ and convert them to downlink electrical signals SD$_A$. In an example embodiment, O/E converter 62A includes a photodetector 120A optically coupled to output end 72A of downlink optical fiber 76DA, an amplifier 110A electrically coupled to the photodetector, and a RF filter 114A electrically coupled to the amplifier. A RF cable section 119A is electrically coupled to RF filter 114A. RF cable section 119A carries downlink electrical signals SD$_A$ and leads to transmit port 42T of transmitter patch 40T.

Likewise, O/E converter 62B is adapted to receive downlink optical signals SD'$_B$ and convert them to downlink electrical signals SD$_B$. In an example embodiment, O/E converter 62B includes a photodetector 120B optically coupled to output end 72B of downlink optical fiber 76DB, an amplifier 110B electrically coupled to the photodetector, and a RF filter 114B electrically coupled to the amplifier. A RF cable section 119B is electrically coupled to RF filter 114B. RF cable section 119B carries downlink electrical signals SD$_B$ and leads to transmit port 52T of transmitter patch 50.

In an example embodiment, laser 100 is adapted to deliver sufficient dynamic range for one or more RoF applications. Examples of suitable lasers for E/O converter 60 include laser diodes, distributed feedback (DFB) lasers, Fabry-Perot (FP) lasers, and VCSELs.

Antenna System Performance

Figure 4A:
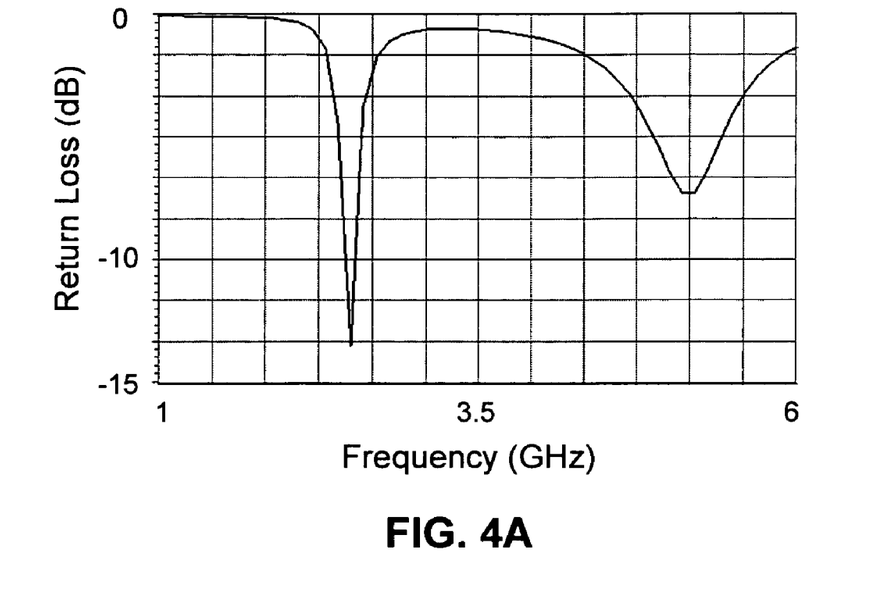
FIG. 4A and FIG. 4B are plots of frequency (GHz) vs. Power (dB) illustrating the return loss and isolation, respectively, of the Z-shaped 2.5 GHz transmit and receive patch antennas of FIG. 2.
Figure 4B:
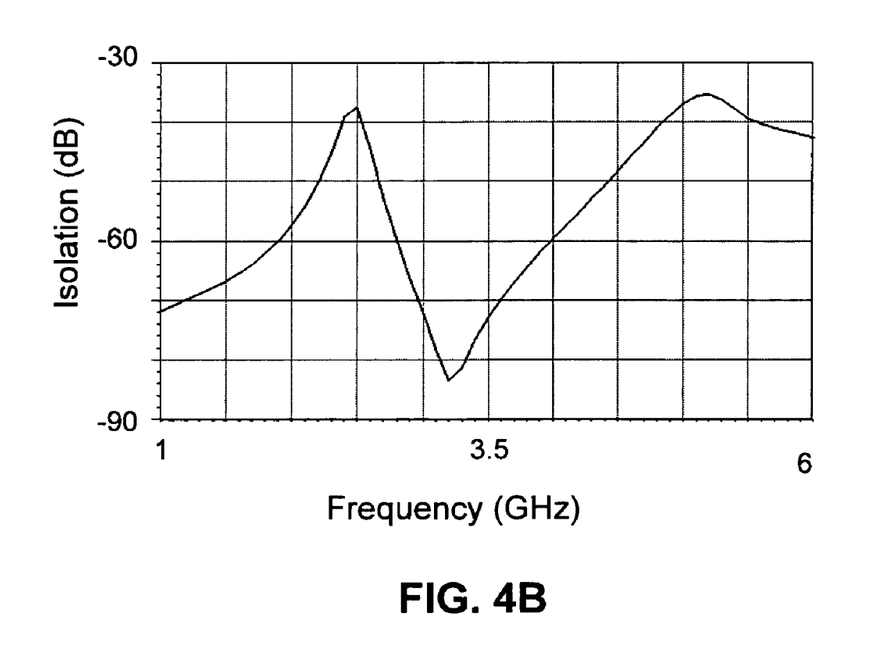

FIGS. 4A and 4B are plots of frequency (GHz) vs. Power (dB) illustrating the performance of an example embodiment of antenna system 30 for the 2.4 GHZ transmit and receive patch antennas 40T and 40R. Both antenna elements are identical and thus have the same radiation characteristics. FIG. 4A plots the return loss, and FIG. 4B plots the isolation between the transmit and receive channels. The isolation between antennas 40T and 40R is greater than 30 dB. This means that there is very little cross talk despite the proximity of transmit and receive patches 40T and 40R. The radiation patterns for patch antennas 40T and 40R are oriented mainly in the forward direction, i.e., normal to substrate surface 34, and have a relatively high front-to-back ratio of greater than 20 dB. A high front-to-back ratio ensures that most of the useful radiated power is directed forward. A low front-to-back ratio leads to unwanted backward-propagating radiation and results in cross talk with picocells located above (i.e., behind or backward of) the antenna, as described below.

Figure 5:
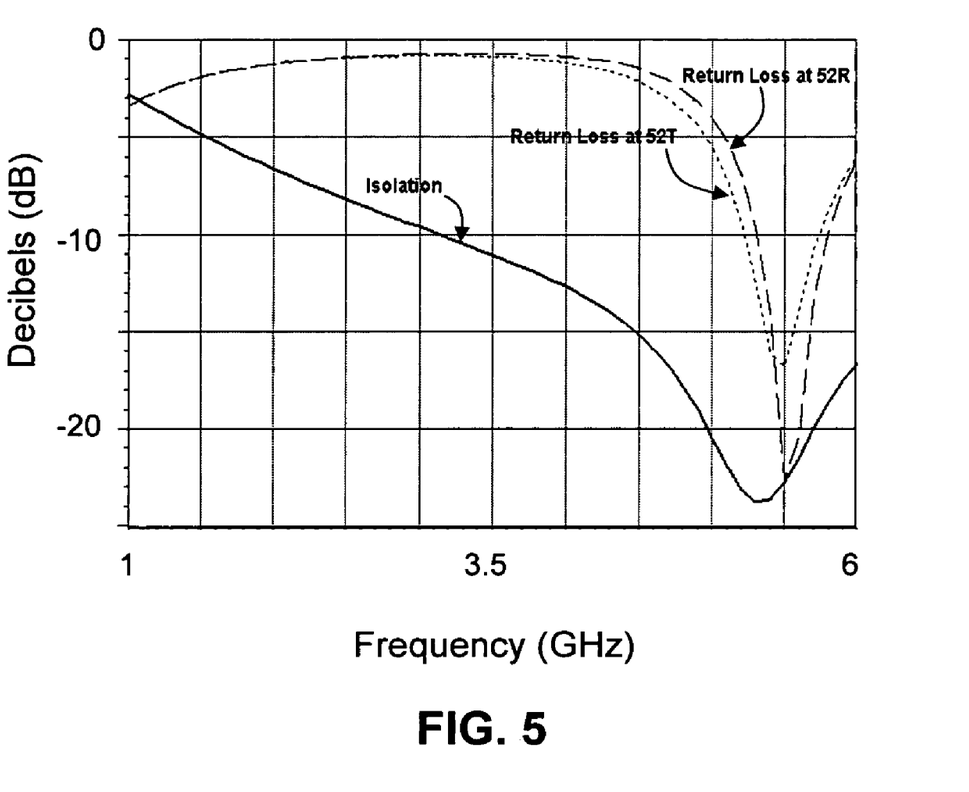
FIG. 5 is a plot of frequency (GHz) vs. Power (dB) for the return loss and isolation for the 5.2 GHz square patch antenna of FIG. 2.

FIG. 5 plots frequency (GHz) vs. Power (dB) for the isolation and return loss of an example embodiment of patch antenna 50 at 5.2 GHz. The isolation between the transmit port 52T and the receive port 52R is ~25 dB. This means that cross talk is limited despite the proximity of the transmit and the receive ports 52T and 52R (this proximity is ~4.25 mm in the above-described example embodiment of patch antenna 50). As with the case of the 2.4 GHz patch antenna 40T and 40R, the radiation pattern is mainly oriented in the forward direction (i.e., orthogonal to antenna substrate surface 34) with a relatively high front-to-back ratio of greater than 20 dB.

RoF Optical Fiber Cable with Transponders

Figure 6A:
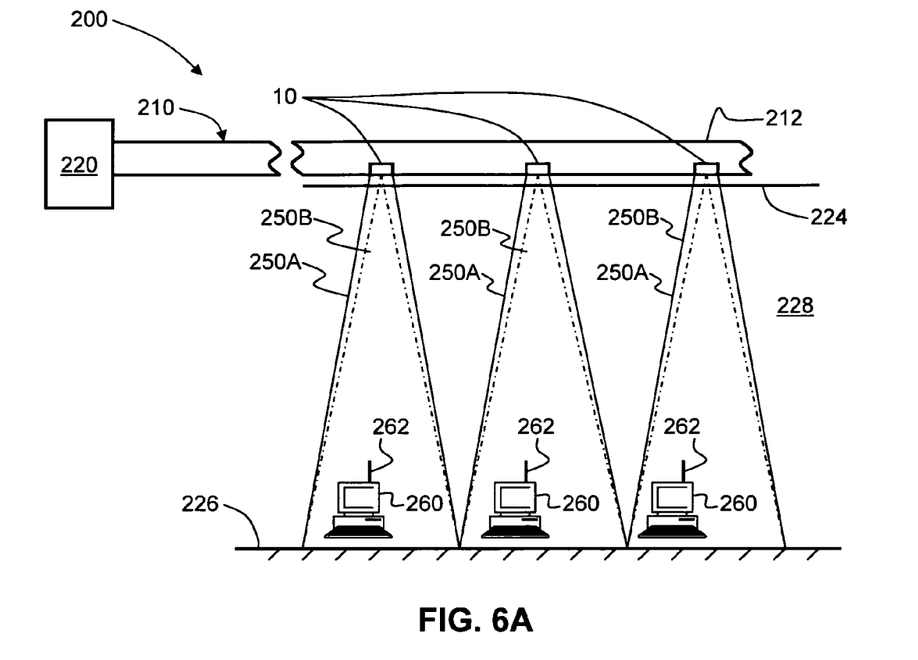
FIG. 6A is a schematic diagram of a RoF picocellular wireless system that employs the transponders of the present invention as supported within an optical fiber cable.

FIG. 6A is a schematic diagram of a RoF picocellular wireless system 200 that includes a RoF optical fiber cable 210 having a protective outer jacket 212. Optical fiber cable 210 is optically coupled to a head-end station 220 and that is adapted to operably support one or more transponders 10. RoF cable 210 is shown arranged above a ceiling 224 so that transponders 10 transmit downwards towards a floor 226 of a room 228. In an example embodiment, ceiling 224 is RF-transparent and the transponders transmit through the ceiling.

Figure 6B:
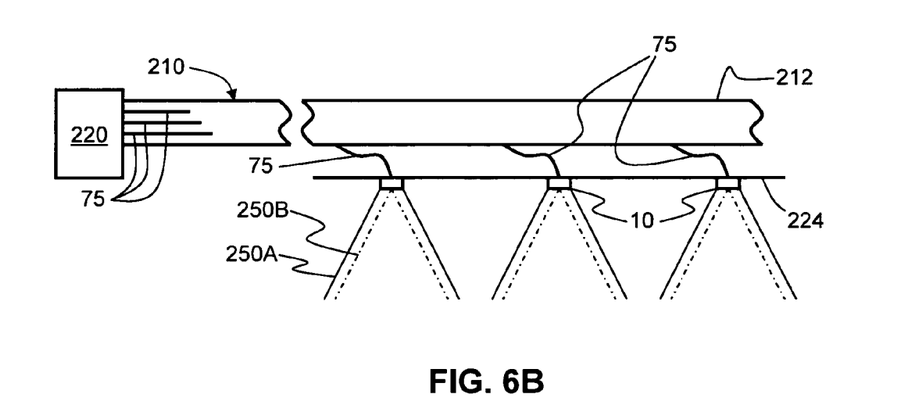
FIG. 6B is similar to FIG. 6A and illustrates an example embodiment wherein the transponders are supported by optical fiber communication links carried by the optical fiber cable and reside outside of the optical fiber cable's protective outer jacket.

FIG. 6B is similar to FIG. 6A and illustrates an example embodiment wherein transponders 10 are arranged outside of optical fiber outer jacket 212. In this example embodiment, optical fiber communication links 75 operably support each transponder 10 and are carried substantially within outer jacket 212. However, a portion of each optical fiber communication link 75 at the associated transponder 10 extends beyond protective outer jacket 212. This allows transponders 10 to be placed in a desired location outside of the optical fiber cable protective outer jacket 212, such as directly onto ceiling 224.

Figure 7:
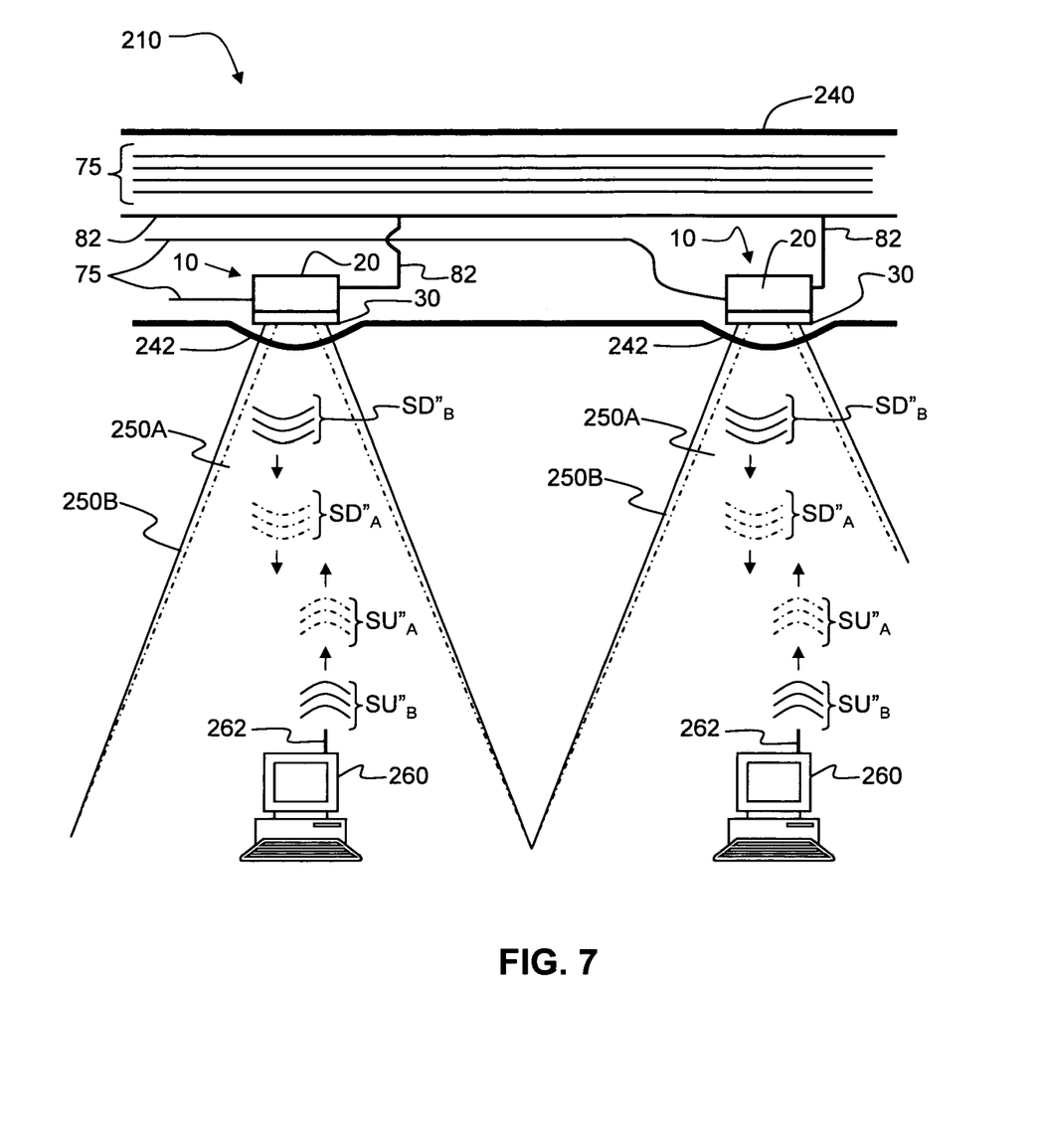
FIG. 7 is a close-up detailed schematic diagram of a section of the optical fiber cable of the system of FIG. 6A, showing the two picocells formed by each transponder at the two different frequencies $f_A$ and $f_B$, and showing the uplink and downlink electromagnetic signals at the two different frequencies being exchanged between a client device and the transponder in each picocell.

FIG. 7 is a close-up schematic diagram of RoF optical fiber cable 210 of FIG. 6A. RoF optical fiber cable 210 carries one or more optical fiber communication links 75 optically coupled to corresponding one or more transponders 10, such as illustrated in FIG. 3. In an example embodiment, outer jacket 212 includes one or more recesses 242 that respectively accommodate the one or more transponders 10 so that the transponders can lie just within the optical fiber cable immediately adjacent the protective outer jacket. The compact microstrip design of antenna system 30 facilitates incorporating transponders 10 into optical fiber cable 210. In an example embodiment, antenna substrate 32 constitutes one of the walls of converter unit housing 22.

As described above, each transponder 10 is adapted to receive downlink optical signals $SD'_A$ and $SD'_B$ of respective frequencies $f_A$ and $f_B$ sent from head-end station 220. In an example embodiment $f_A$=2.4 GHz and $f_B$=5.2 GHz, and represent different services, such as voice and data services. Each transponder 10 converts these downlink optical signals into corresponding downlink electrical signals $SD_A$ and $SD_B$, which are respectively fed to transmission port 42T of patch antenna 40T and transmission port 52T of patch antenna 50. These patch antennas then respectively radiate downlink electromagnetic signals $SD''_A$ and $SD''_B$ (FIG. 7). These electromagnetic signals form corresponding picocells 250A and 250B that extend substantially perpendicular to antenna substrate surface 34 and thus extend locally perpendicular to (i.e., outward from) optical fiber cable 210. In an example embodiment, picocells 250A and 250B formed by a given transponder 10 are substantially co-located—i.e., they substantially overlap. Also in an example embodiment, transponders 10 are spaced apart such that picocells of adjacent transponders are not co-located, i.e., they do not substantially overlap and thus do not substantially interfere.

The directionality of antenna system 30 forms picocells 250A and 250B that are directed downward from ceiling 224 towards floor 226. Downward-directed picocells are desirable because they do not substantially overlap (interfere) with picocells that may exist in a room above ceiling 224, and because they provide more usable radiation (i.e., stronger downlink electromagnetic signals $SD''_A$ and $SD''_B$) to client devices 260 located inside room 228 and within picocells 250A and/or 250B.

Client devices 260 typically have their own antenna systems 262 adapted to receive electromagnetic downlink signals $SD''_A$ and/or $SD''_B$ and transmit electromagnetic uplink signals $SU''_A$ and/or $SU''_B$. Example client devices 260 include cellular phones that transmit and receive voice and text messaging, and computers and hand-held devices that transmit and receive data.

Electromagnetic uplink signals $SU''_A$ from client device(s) 260 are received by receiving patch antenna 52R associated with picocell 250A, and are converted to corresponding uplink electrical signals $SU_A$. These electrical signals are processed by E/O converter 60A, which forms uplink optical signals $SU'_A$ that are coupled into uplink optical fiber 76UA of the corresponding optical fiber communication link 75 and sent to head-end station 220 for processing.

Likewise, electromagnetic uplink signals $SU''_B$ are received by patch antenna 40R associated with picocell 250B, and converted to corresponding uplink electrical signals $SU_B$. These electrical signals are processed by E/O converter 60B, which forms uplink optical signals $SU'_B$ that are coupled into uplink optical fiber 76UB of the corresponding optical fiber communication link 75 and sent to head-end station 220 for processing.

Head-End Station

Figure 8:
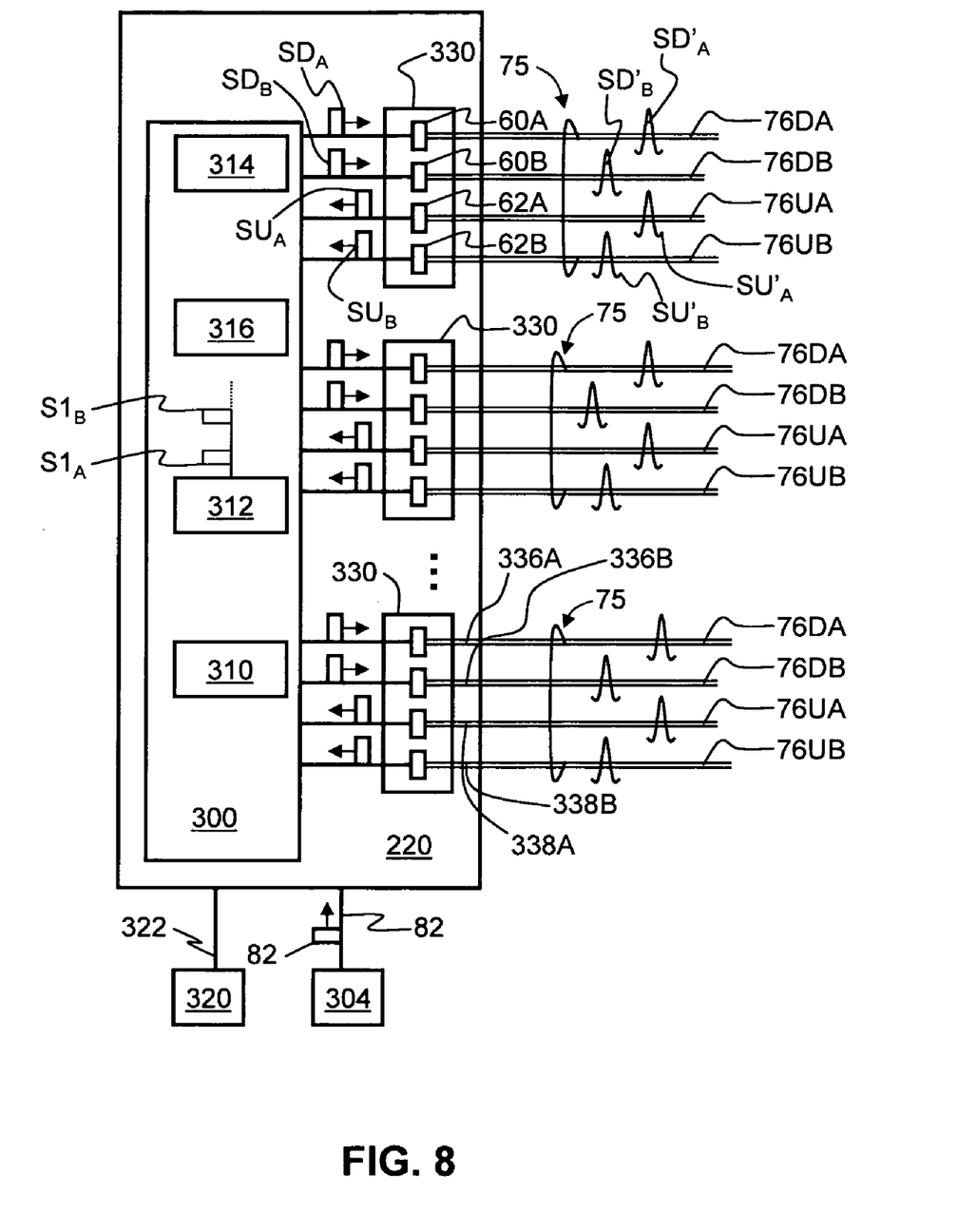
FIG. 8 is a detailed schematic diagram of an example embodiment of the head-end station for the system of FIG. 6A.

FIG. 8 is a detailed schematic diagram of an example embodiment of head-end station 220. Head-end station 220 includes a controller 300 that provides RF signals for one or more particular wireless services or applications, such voice service at $f_A$~2.4 GHz and data service signals at $f_B$~5.2 GHz. Head-end station 220 is electrically coupled to a power supply 304 via electrical power line 82, which as discussed above is used to provide power to each transponder 10 as well as to the head-end station.

In an example embodiment, controller 300 includes a RF signal modulator/demodulator unit 310 for modulating/demodulating RF signals, a digital signal processor 312 for generating digital signals, a central processing unit (CPU) 314 for processing data and otherwise performing logic and computing operations, and a memory unit 316 for storing data. In an example embodiment, controller 300 is adapted to provide WLAN signal distribution as specified in the IEEE 802.11 standard, i.e., in the frequency range from 2.4 to 2.5 GHz and/or from 5.0 to 6.0 GHz. In an example embodiment, controller 300 serves as a pass-through unit that merely coordinates distributing downlink electrical signals $SD_A$, $SD_B$ and/or uplink electrical signals $SU_A$, $SU_B$ from and to outside network 320 via a communication link 322, or between picocells.

Head-end station 220 includes one or more head-end converter units 330, which in an example embodiment are similar if not identical to transponder units 20, with each head-end converter unit having E/O converters 60A and 60B and O/E converters 62A and 62B. Each E/O converter 60A and 60B and each O/E converter 62A and 62B is electrically coupled to controller 300 and is also optically coupled to a corresponding transponder 10 via a corresponding optical communication link 75.

In an example embodiment, optical communication link 75 includes downlink optical fibers 76DA and 76DB, and uplink optical fibers 76UA and 76UB, as shown in FIG. 8. In this example, E/O converter 60A is optically coupled to an input end 336A of downlink optical fiber 76DA, E/O converter 60B is optically coupled to an input end 336B of downlink optical fiber 76DB, O/E converter 62A is optically coupled to an input end 338A of uplink optical fiber 76UA, and E/O converter 62B is optically coupled to an input end 338B of uplink optical fiber 76UB.

With reference to FIG. 7 and FIG. 8, in an example embodiment of the operation of RoF wireless picocellular system 200, digital signal processor 312 in controller 300 generates a downlink electrical signal $S1_A$ corresponding to frequency $f_A$=2.4 GHz. This signal is received and modulated by RF signal modulator/demodulator 310 to create downlink electrical RF signal ("electrical signal") $SD_A$ designed to communicate data to one or more client devices 260 in picocell(s) 250A. Electrical signal $SD_A$ is received by one or more E/O converters 60A, which converts this electrical signal into corresponding optical signal $SU'_A$, which is then coupled into the corresponding one or more downlink optical fibers 76DA.

Optical signal $SD'_A$ travels over the one or more downlink optical fibers 76DA to the corresponding transponder(s) 10 and are processed as described above to communicate with client device(s) 260 within the corresponding one or more picocells 250A. The electromagnetic uplink signals $SD''_A$ from client device(s) 260 are converted to an uplink optical signals $SU'_A$ by the corresponding transponders 10 and coupled into the corresponding uplink optical fibers 76UA. Optical signals $SU'_A$ are received at head-end station 220 by the corresponding one or more O/E converters 62A in the corresponding head-end converter unit(s) 330. O/E converters 62A convert optical signals $SU'_A$ back into electrical signals $SU_A$, which are then processed. Here, in an example embodiment "processed" includes one or more of the following: storing the signal information in memory unit 316; digitally processing or conditioning the signal in controller 300; sending the electrical signal $SU_A$, whether conditioned or unconditioned, on to one or more outside networks 320 via communication link 322; and sending the signal to one or more client devices 260 within the same or other picocells 250A. In an example embodiment, the processing of signal $SU_A$ includes demodulating this electrical signal in RF signal modulator/demodulator unit 310, and then processing the demodulated signal in digital signal processor 312.

Further in an example embodiment of the operation of system 200, digital signal processor 312 in controller 300 generates a downlink digital RF signal $S1_B$ at frequency $f_B$=5.2 GHz. This signal is received and modulated by RF signal modulator/demodulator 310 to create downlink electrical RF signals ("electrical signal") $SD_B$ designed to communicate data to one or more client devices 260 in picocell(s) 250B. Electrical signals $SD_B$ are received by one or more E/O converters 60B, which converts these electrical signals into corresponding optical signals $SU'_B$, which are then coupled into one or more downlink optical fibers 76DB.

Optical signals $SD'_B$ travel over the one or more downlink optical fibers 76DB to the corresponding transponders 10 and are processed as described above to communicate with client device(s) 260 within the corresponding one or more picocells 250B. The electromagnetic uplink signals $SD''_B$ from client device(s) 260 are converted to uplink optical signals $SU'_B$ by the corresponding transponders 10 and are coupled into the corresponding one or more uplink optical fibers 76UB. Optical signals $SU'_B$ are received at head-end station 220 by corresponding one or more O/E converters 62B in the head-end converter unit 330. O/E converters 62B convert optical signals $SU'_B$ back into electrical signals $SU_B$, which are then processed in the same manner as described above in connection with signals $SU_A$.

The ability of transponders 10 to handle dual bands allows different services to be provided by head-end station 220 at the two different frequencies $f_A$ and $f_B$.

Four-Fiber Dual Band Capability

The example embodiment of transponder 10 discussed above has four antenna ports (42T, 42R, 52T and 52R) and four optical fiber ports P1, P2, P3 and P4. This is a preferred embodiment for the design of transponder 10. Typical multiband microstrip antennas use a single antenna port in combination with filters for separating electrical signals in the different frequency bands. This approach, however, adds cost and introduces complexities associated with the need for additional electronics for transponder 10, which is preferably small and avoids complexity.

Two-Fiber Dual Band Capability

Figure 9:
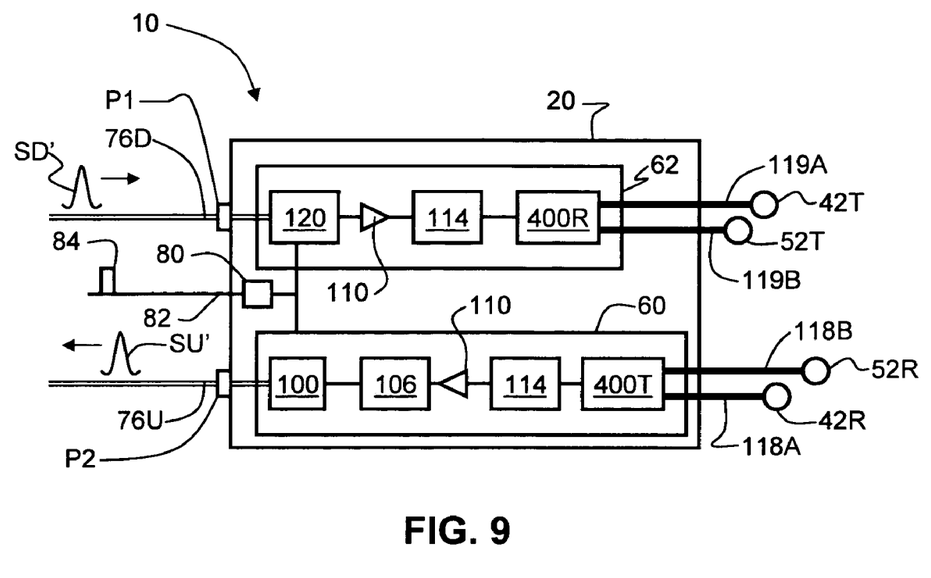
FIG. 9 is a detailed schematic diagram of an example embodiment of a two-port transponder that utilizes subcarrier modulation (SCM)

An example embodiment of the present invention uses two optical fibers and two optical fiber ports P1 and P2 rather than four optical fibers and four optical fiber ports for each transponder. This reduction in the number of optical fibers is accomplished using sub-carrier multiplexing (SCM). FIG. 9 is a schematic diagram of an example embodiment of a converter unit 20 for a two-fiber transponder 10 according to the present invention. Two-fiber converter unit 20 of FIG. 9 is similar to four-fiber converter unit 20 of FIG. 3, except that instead of separate E/O converters 60A and 60B and O/E converters 62A and 62B, only one E/O converter 60 and one O/E converter 62 is needed. Likewise, only two optical fiber ports P1 and P2 are needed. E/O converter 60 includes a SCM transmitter 400T electrically coupled to RF filter 114 and to receiver port 42R of patch antenna 40R via RF cable 118A and to receiver port 52R of patch antenna 50 via RF cable 118B. Similarly, O/E converter 62 includes an SCM receiver 400R electrically coupled to RF filter 114 and to receiver port 42R of patch antenna 40R via RF cable 118A and to receiver port 52R of patch antenna 50 via RF cable 118B.

SCM transmitter 400T is adapted to receive RF uplink electrical signals $SU_A$ and $SU_B$ of frequencies $f_A$ and $f_B$ and perform subcarrier multiplexing by impressing the two uplink electrical signals onto a subcarrier wave that is subsequently impressed on the optical carrier generated by laser 100. This forms an uplink SCM optical signal SU' that includes the information in signals $SU_A$ and $SU_B$.

Likewise, SCM receiver 400R in O/E converter 62 is adapted to receive a downlink SCM electrical signal SD and demultiplex this signal to recover downlink electrical signals $SU_A$ and $SU_B$.

Figure 10:
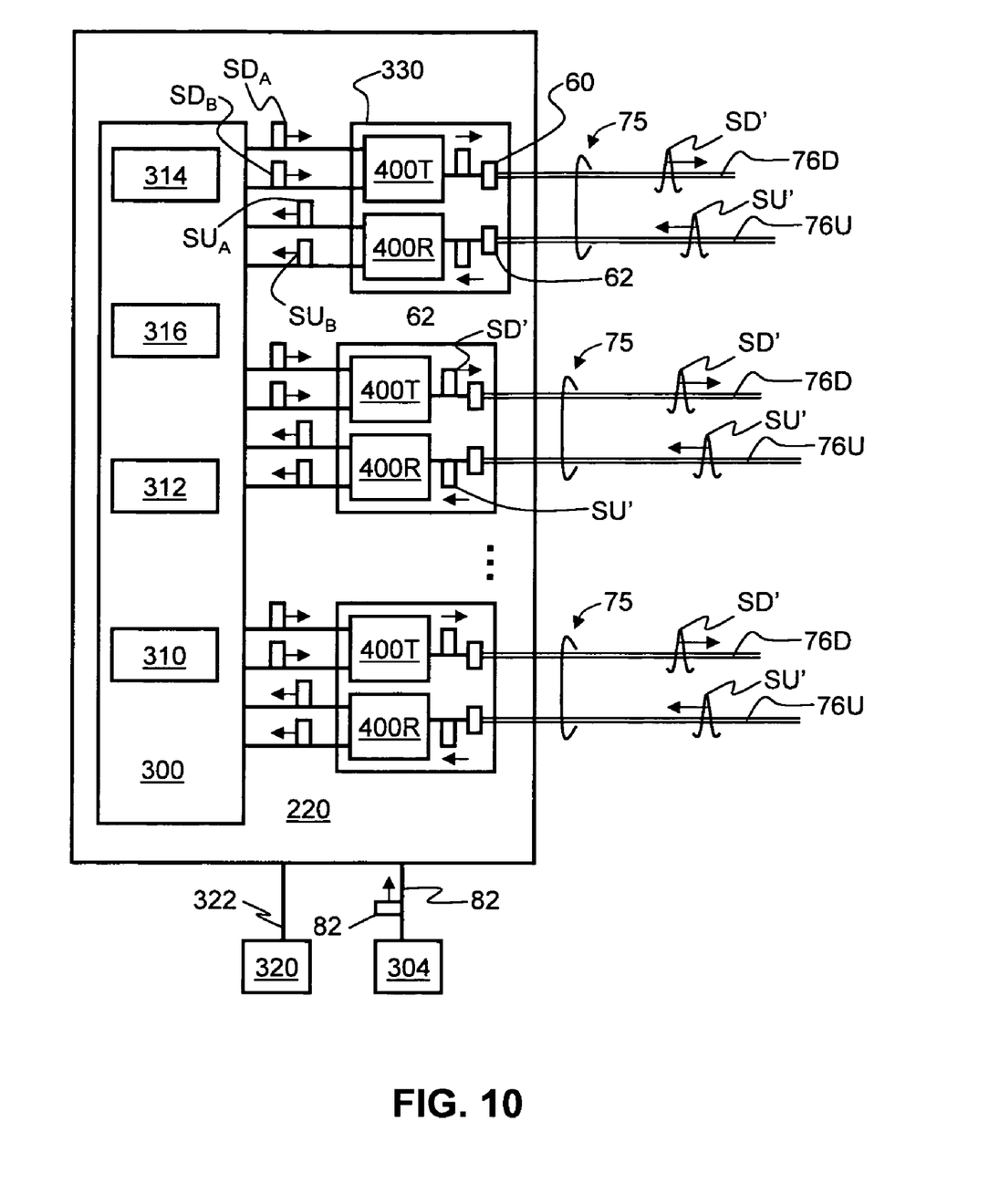
FIG. 10 is a detailed schematic diagram of an example embodiment of a head-end station similar to that of FIG. 8, but modified to be compatible with one or more two-port transponders of the type shown in FIG. 9.

FIG. 10 is a schematic diagram of an example embodiment of a modified version of head-end station 220 of FIG. 8, wherein the head-end station is compatible with optical fiber cables 210 that support one or more two-fiber transponders 10 such as shown in FIG. 9. Head-end station 220 is the same as that of FIG. 8, but head-end converter units 330 include a single E/O converter 60 and a single O/E converter 62 rather than two of each (i.e., 60A, 60B and 62A, 62B) to accommodate the two signal frequencies $f_A$ and $f_B$. Likewise, optical communication link 75 includes one downlink optical fiber 76D and one uplink optical fiber 76U for each two-port transponder 10. Each head-end converter 330 includes an SCM transmitter 400T electrically coupled to E/O converter 60, and an SCM receiver 400R electrically coupled to O/E converter 62. SCM transmitter 400T is electrically coupled to controller 300 and is adapted to receive therefrom downlink electrical signals $SD_A$ and $SD_B$ and form SCM-multiplexed downlink electrical signal SD'.

Likewise, SCM receiver 400R is electrically coupled to controller 300 and as adapted to de-multiplex SCM-multiplexed uplink electrical signal SU to recover uplink electrical signals $SU_A$ and $SU_B$ and send these signals to controller 300.

SCM-multiplexed downlink electrical signal SD is fed to E/O converter 60, which creates SCM-multiplex downlink optical signal SD', which is coupled into downlink optical fiber 76D and travels to the corresponding transponder 10. Likewise, O/E converter unit 62 receives SCM-multiplexed uplink optical signal SU' via uplink optical fiber 76U and forms the corresponding electrical signal SU, which is then demultiplexed by SCM receiver 400R.

Because the different-frequency downlink and uplink RF electrical signals are multiplexed and then converted into SCM downlink optical signal SD' and to SCM uplink optical signal SU', optical fiber communication link 75 need only include one downlink optical fiber 76D and one uplink optical fiber 76U for each transponder 10 in optical fiber cable 210. This simplifies the design of optical fiber cable 210 (FIG. 7), although it makes for slightly greater electronic complexity of transponders 10.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A radio-over-fiber (RoF) transponder, comprising:
    a converter unit adapted to convert RF electrical signals into RF optical signals and vice versa;
    an antenna system electrically coupled to the converter unit, the antenna system having an antenna substrate with a surface;
    first and second patch antenna elements formed on the antenna substrate surface and adapted to respectively transmit and receive radio-frequency (RF) electromagnetic radiation at a first frequency $f_A$ over a first picocell; and
    a third patch antenna element formed on the antenna substrate surface and adapted to transmit and receive RF electromagnetic radiation at a second frequency $f_B$ over a second picocell that at least substantially overlaps the first picocell.

2. The transponder of claim 1, wherein the first and second patch antenna elements define Z-shaped patch antenna elements and wherein the third patch antenna element defines a square patch antenna element.

3. The transponder of claim 1, wherein the third patch antenna element is formed on the antenna substrate surface between the first and second patch antenna elements.

4. The transponder of claim 1, wherein $f_A$ is a frequency in a 2.4 GHz band and $f_B$ is a frequency in a 5.2 GHz band.

5. The transponder of claim 1, wherein the converter unit includes:
    first and second E/O converters that convert an RF electrical signal into an RF optical signal for respective first and second frequencies $f_A$ and $f_B$; and
    first and second O/E converters that convert an RF optical signal into an RF electrical signal for the first and second frequencies $f_A$ and $f_B$, respectively.

6. The transponder of claim 5, including:
    first and second downlink optical fibers respectively optically coupled to the first and second O/E converters and adapted to carry downlink RF optical signals having frequency $f_A$ and $f_B$, respectively; and
    first and second uplink optical fibers respectively optically coupled to the first and second E/O converters and adapted to carry downlink RF optical signals having frequencies $f_A$ and $f_B$, respectively.

7. A radio-over-fiber (RoF) optical fiber cable, comprising:
    an outer protective jacket;
    one or more optical fiber communication links supported at least substantially within the outer protective jacket;
    one or more spaced apart transponders according to claim 6 arranged to form an array of corresponding one or more first and second picocells in response to corresponding one or more of the downlink RF optical signals being provided to the corresponding one or more transponders, wherein picocells of adjacent transponders do not substantially interfere.

8. The optical fiber of claim 7, wherein the transponders are located within the outer protective jacket.

9. The transponder of claim 1, wherein the converter unit includes:
    an E/O converter that includes a sub-carrier multiplexing (SCM) transmitter adapted to sub-carrier multiplex uplink RF electrical signals of respective frequencies $f_A$ and $f_B$ onto a sub-carrier multiplexed (SCM) uplink electrical signal, the E/O convert adapted to convert the SCM uplink electrical signal into an SCN uplink optical signal; and
    an O/E converter adapted to receive an SCM downlink optical signal and convert it to an SCM downlink electrical signal, the O/E converter having an SCM receiver adapted to receive and demultiplex the SCM downlink electrical signal to obtain downlink RF electrical signals of respective frequencies $f_A$ and $f_B$.

10. The transponder of claim 9, further including:
    a downlink optical fiber optically coupled to the O/E converter and adapted to carry the SCM downlink optical signal; and
    an uplink optical fiber optically coupled to the E/O converter and adapted to carry the SCM uplink optical signal.

11. A radio-over-fiber (RoF) optical fiber cable, comprising:
    an outer protective jacket;
    one or more optical fiber communication links supported at least substantially within the outer protective jacket;
    one or more spaced apart transponders according to claim 10 arranged to form an array of corresponding one or more first and second picocells in response to corresponding one or more of the SCM downlink optical signals being provided to the corresponding one or more transponders, wherein the picocells of adjacent transponders do not substantially interfere.

12. The optical fiber of claim 11, wherein the transponders are located within the outer protective jacket.

13. The transponder of claim 1, further including a conductive ground layer operatively arranged between the antenna substrate and the converter unit.

14. The transponder of claim 1, wherein at least one of the first and second patch antenna elements has a single antenna port, and the third patch antenna element has two antenna ports.

15. A radio-over-fiber (RoF) picocellular wireless system, comprising:

a head-end station adapted to provide first and second downlink RF optical signals having respective first and second frequencies $f_A$ and $f_B$, and adapted to receive and process first and second uplink RF optical signals having respective first and second frequencies $f_A$ and $f_B$;

an optical fiber cable optically coupled to the head-end station, the optical fiber cable having one or more optical fiber communication links adapted to carry the first and second downlink RF optical signals and the first and second uplink optical signals;

one or more transponders respectively optically coupled to the corresponding one or more optical fiber communication links, with at least one transponder having a converter unit adapted to convert RF optical signals to RF electrical signals and vice versa; and wherein at least one transponder includes a micro-strip antenna system with first and second patch antenna elements adapted to respectively transmit and receive RF electromagnetic radiation at the first frequency $f_A$ over a first picocell, and a third patch antenna element adapted to transmit and receive RF electromagnetic radiation at the second frequency $f_B$ over a second picocell substantially co-located with the first picocell, and wherein picocells of adjacent transponders do not substantially interfere.

16. The system of claim 15, wherein:

at least one transponder includes first and second optical fiber ports, and at least one optical communication link includes a downlink optical fiber coupled to the first optical fiber port and an uplink optical fiber optically coupled to the second port; and wherein at least one transponder is adapted to (a) perform sub-carrier multiplexing of first and second uplink electrical signals of frequencies $f_A$ and $f_B$, and (b) perform sub-carrier de-multiplexing of first and second uplink electrical signals of frequencies $f_A$ and $f_B$.

17. The system of claim 15, wherein the optical fiber cable is arranged above a ceiling of a room.

18. The system of claim 15, wherein the first frequency $f_A$ is in a 2.4 GHz band and the second frequency $f_B$ is in a 5.2 GHz band.

19. The transponder of claim 15, wherein the first and second patch antenna elements define Z-shaped patch antenna elements and wherein the third patch antenna element defines a square patch antenna element.

20. The transponder of claim 15, wherein the third patch antenna element is formed on the antenna substrate surface between the first and second patch antenna elements.

21. A method of generating first and second substantially co-located first and second picocells at respective first and second frequencies, comprising:

providing first and second downlink RF optical signals of respective first and second frequencies $f_A$ and $f_B$ to a radio-over-fiber (RoF) transponder;

at the transponder, converting the first and second downlink RF optical signals to corresponding first and second electrical signals;

feeding the first electrical downlink signals to first and second patch antenna elements adapted to transmit at the first frequency $f_A$ so as to form a first picocell; and feeding the second electrical downlink signals to a third patch antenna element adapted to transmit at the second frequency $f_B$ so as to form a second picocell substantially co-located with the first picocell.

22. The method of claim 21, including operably supporting one or more transponders with an optical fiber cable, thereby forming an array of co-located first and second picocells, wherein picocells of adjacent transponders do not substantially interfere.

23. The method of claim 21, including:

performing sub-carrier multiplexing on the first and second downlink electrical signals at a head-end station operably coupled to the transponder;

providing the first and second downlink RF optical signals to the transponder as a sub-carrier multiplexed optical signal; and performing sub-carrier de-multiplexing at the transponder to recover the first and second downlink electrical signals.

24. The method of claim 21, including communicating with one or more client devices with the first and/or second picocells at the first and/or second wavelength by exchanging first and/or second downlink and uplink electromagnetic signals of corresponding first and/or second frequencies $f_A$ and $f_B$, between the transponder and the one or more client devices.

* * * * *